May 28, 1946.    G. L. USSELMAN    2,401,205
MONITOR PROBE FOR HIGH FREQUENCY TRANSMISSION LINES
Filed Nov. 21, 1941    2 Sheets-Sheet 1

INVENTOR
George L. Usselman
BY
ATTORNEY

Patented May 28, 1946

2,401,205

UNITED STATES PATENT OFFICE 2,401,205

MONITOR PROBE FOR HIGH-FREQUENCY TRANSMISSION LINES

George L. Usselman, Port Jefferson, N. Y., assignor to Radio Corporation of America, a corporation of Delaware Application November 21, 1941, Serial No. 419,977

2 Claims. (Cl. 178—44)

This invention relates to a novel and useful device for picking up a small amount of radio frequency power for monitoring purposes, from an ultra-high frequency circuit.

An object of this invention is to provide a simple and efficient monitor pickup probe for a coaxial line.

Another object of this invention provides a pickup probe for a gas or fluid-tight transmission line.

A feature of this invention is the novel arrangement of the device with that of a fluid-tight transmission line and the ingenious shielding method.

In the prior art, the monitor probes applied to a more or less open transmission line did not present very difficult problems. However, when such a device is for use with a coaxial transmission line, which is filled with a compressed gas or fluid more than the ordinary ingenuity must be exercised to provide a suitable radio frequency pickup device without allowing the gas or fluid to escape. This invention provides an improved adjustable insulated gas-tight pickup probe to meet the rigid requirements.

This invention will best be understood by referring to the accompanying drawings, in which.

Figure 1:
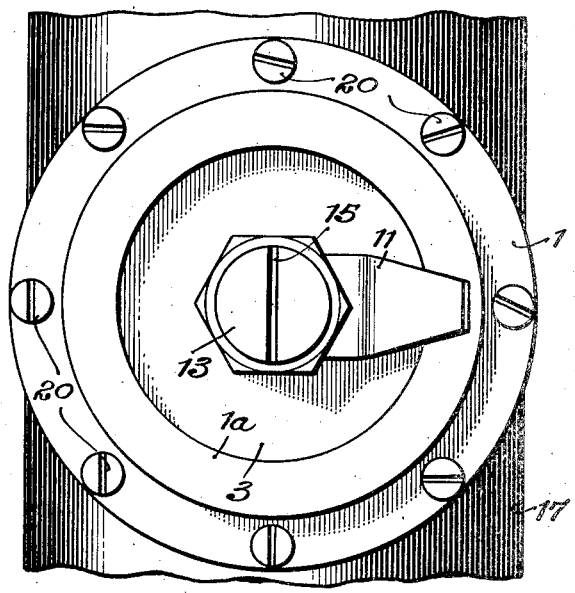
Fig. 1 is a plan view with the cover removed of the pickup probe of this invention.
Figure 2:
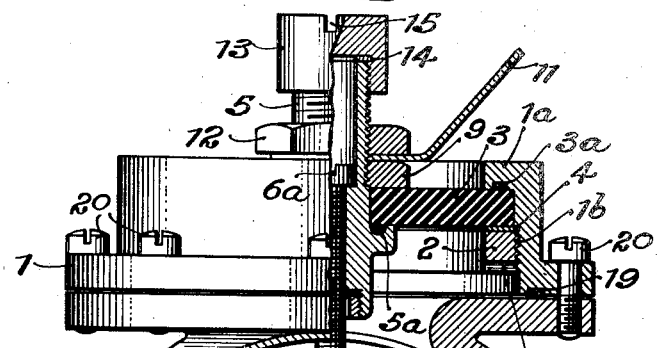
Fig. 2 is an elevational view partly in section of Fig. 1.
Figure 2:
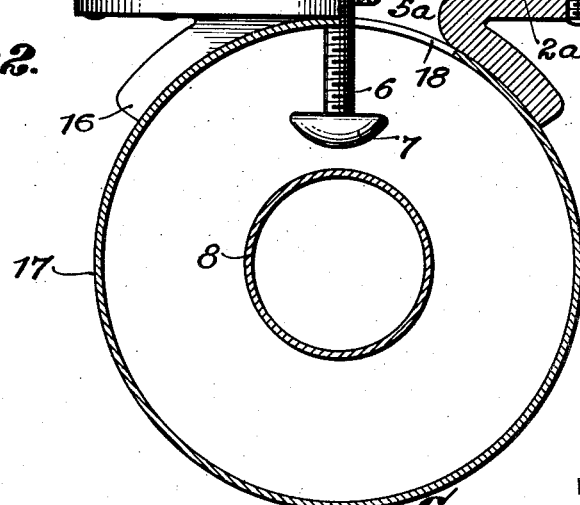
Figure 3:
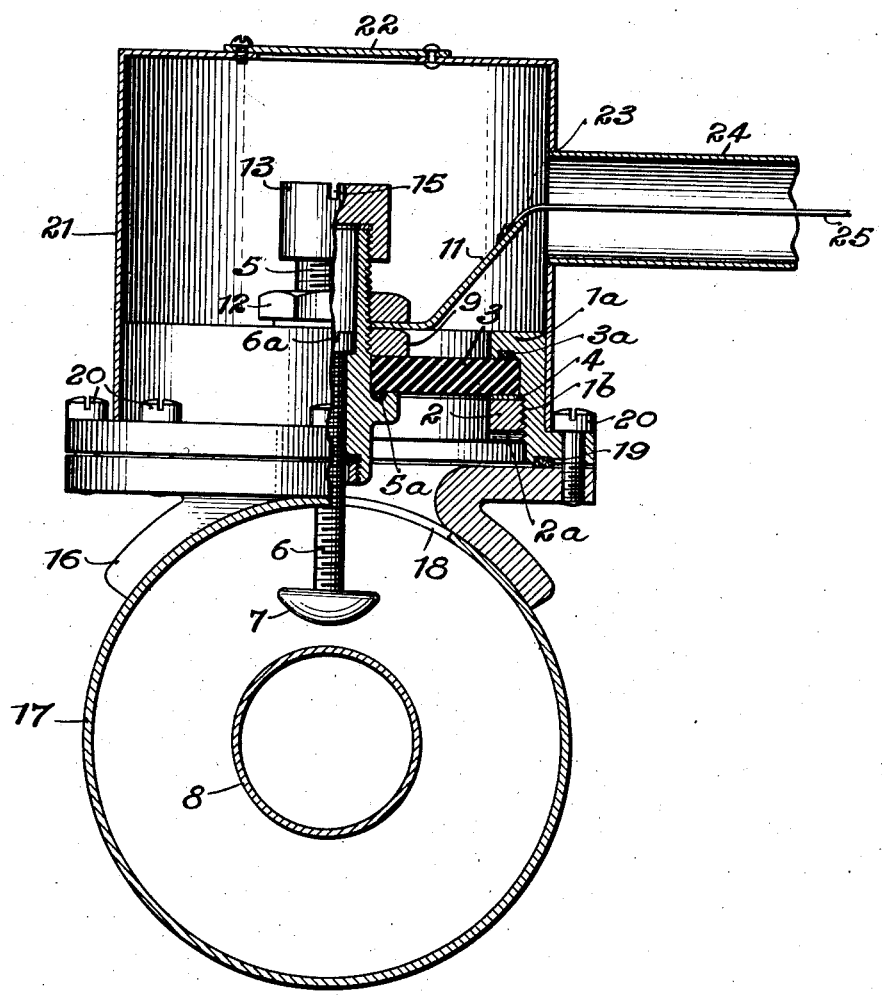
Fig. 3 is another elevational view partly in section showing the shield and low power coaxial line connected thereto.

Referring now in detail to the drawings, a flange-shaped metallic housing 1 is provided with an upper inwardly extending rim portion 1a. The lower portion is threaded at 1b to receive a threaded clamp ring 2 which is slotted at 2a for rotation in threads 1b. An insulating base 3 of "Micalex" for closing off one end of the housing is forced against rim 1a which is slotted to receive a packing ring 3a. The insulating disc 3 is secured in place by means of clamp ring 2. A thin spring washer 4 of beryllium copper is interposed between the under surface of base 3 and clamp ring 2 to insure pressure on packing ring 3a. A central brass hollow support member 5 is provided with internal and external threads. A threaded stud 6 is slotted at 6a so that it may be freely screwed up and down within member 5. A spherical sector 7 is fastened to the lower end of stud 6 and serves as the capacitive electrode for picking up the desired amount of voltage from the inner conductor 8 of the coaxial line. Member 5 is provided with a packing groove 5a in which packing material is provided to prevent entry of any fluid to the outer portion of the device. Central support member 5 is retained in place by a hexagonal nut 9. A terminal member 11 is fastened to member 5 by means of nut 12. The external thread on member 5 is provided at the upper portion thereof with a knurled cap 13, the cap 13 being made fluid-tight by means of a gasket 14. A screw driver slot 15 is provided in the upper end of cap 13. A support bracket or sub-base 16 is soldered to the outer conductor 17 which is provided with an aperture 18 at any desired point along the line where a pickup of the power is to be taken off. A ring-shaped packing member 19 to prevent loss of fluid is interposed between the top side of member 16 and is retained in a groove in the lower portion of flange 1. Eight fillister screws 20 securely clamp members 1 and 16 together. As shown in Fig. 3, the entire pickup probe of this invention is completely enclosed by a shielded metallic container 21 having a pivoted lid 22. An aperture 23 is located in the side of shield 21 for connecting the outer conductor 24 of the low power pickup line 25. In order that the entire assembly be made gas or fluid-tight, member 16 is securely soldered to the outer conductor 17, also, all surfaces which are joined together are provided with suitable gaskets.

In the operation of this device, lid 22 is moved to one side and knurled cap 13 is removed. A small insulated handle screw driver is passed through the aperture in member 5 to engage the slot 6a of screw 6. It will be noted that screw 6 is provided with a head which prevents member 7 from coming in direct contact with the high voltage flowing in the inner conductor 8. The minimum adjustment between electrode 7 and the inner conductor 8 is approximately $\frac{1}{8}''$, the maximum adjustment being substantially $\frac{1}{2}''$. Screw 6 is elevated up and down until the proper pickup voltage is obtained in the grid circuit of an amplifier unit (not shown) which is connected to the pickup line 25, or if desired, line 25 may connect to the plate or grid circuit of a detector unit.

Probe electrode 7 may be of various sizes to give the proper pickup voltage. Electrode 7 and the aperture 18 in the outer conductor 17 should be well rounded over and polished to prevent arc-over of the high voltage which normally exists in the circuit. The insulator 3 should be strong enough mechanically to resist the live gas pressure and the insulation qualities should have very low loss to prevent failure by heating which occurs in all such ultra-high frequency circuits. Any suitable fluid is pumped in between conductors 8 and 17.

This invention should not be limited to the precise arrangement shown.

What is claimed is:

1. A gas tight pickup probe for an ultra high frequency coaxial line with inner and outer conductors, comprising a metallic fluid tight casing having an upper and lower portion, said lower portion secured in gas tight engagement to the outer conductor of said line, an insulating member closing off one end of the lower portion of said casing, a fluid tight gasket interposed between said insulating member and the lower portion of said casing member, an adjustable capacitive electrode in the form of a spherical sector, a hollow threaded support member, a threaded electrode stud being threaded within said hollow threaded support member for adjusting said capacitive electrode, said threaded support member being supported by said insulating member and sealed within the lower portion of said casing, said capacitive electrode located within said outer conductor and secured to an end of said threaded stud to be in capacitive relationship with the inner conductor of said line, and a fluid tight cap arranged to cover the outer end of said hollow threaded support member.

2. A gas tight pickup probe for an ultra high frequency coaxial line with inner and outer conductors, comprising a metallic fluid tight casing having an upper and lower portion, said lower portion secured in gas tight engagement to the outer conductor of said line, a disc of insulating material closing off one end of the lower portion of said casing, a fluid tight gasket interposed between said disc and the lower portion of said casing member, an adjustable capacitive electrode, a hollow threaded support member, a threaded electrode stud being threaded within said hollow threaded support member for adjusting said capacitive electrode, said threaded support member being supported by said insulating member and sealed within the lower portion of said casing, said capacitive electrode located within said outer conductor and secured to an end of said threaded stud to be in capacitive relationship with the inner conductor of said line, a metallic shield surrounding the hollow threaded support member, and a low power coaxial cable having its outer conductor joined and connected to said shield, and its inner conductor electrically connected to said hollow threaded support member.

GEORGE L. USSELMAN.